(12) United States Patent
Wang

(10) Patent No.: US 11,126,676 B2
(45) Date of Patent: Sep. 21, 2021

(54) INFLUENCE RANK GENERATION SYSTEM FOR ENTERPRISE COMMUNITY USING SOCIAL GRAPH

(71) Applicant: SAP SE, Walldorf (DE)

(72) Inventor: Chongyao Wang, Changhai (CN)

(73) Assignee: SAP SE, Walldorf (DE)

( * ) Notice: Subject to any disclaimer, the term of this patent is extended or adjusted under 35 U.S.C. 154(b) by 253 days.

(21) Appl. No.: 16/214,491

(22) Filed: Dec. 10, 2018

(65) Prior Publication Data

US 2020/0183997 A1  Jun. 11, 2020

(51) Int. Cl.
*G06F 16/9536* (2019.01)
*G06Q 50/00* (2012.01)
*H04W 4/21* (2018.01)
*G06F 16/9535* (2019.01)

(52) U.S. Cl.
CPC ...... *G06F 16/9536* (2019.01); *G06F 16/9535* (2019.01); *G06Q 50/01* (2013.01); *H04W 4/21* (2018.02)

(58) Field of Classification Search
CPC ........ G06Q 50/01; G06Q 30/02; G06Q 30/00; G06F 16/3323; G06F 16/9536; H04L 67/10; H04L 67/3005
See application file for complete search history.

(56) References Cited

U.S. PATENT DOCUMENTS

| | | | | |
|---|---|---|---|---|
| 8,938,500 | B1* | 1/2015 | Acharya | G06Q 50/01 709/204 |
| 2008/0249869 | A1* | 10/2008 | Angell | G06Q 30/02 705/14.1 |
| 2012/0215773 | A1* | 8/2012 | Si | G06Q 30/02 707/723 |
| 2014/0032659 | A1* | 1/2014 | Marini | G06Q 50/01 709/204 |
| 2015/0154309 | A1* | 6/2015 | Niyogi | G06Q 30/00 705/14.66 |
| 2017/0098003 | A1* | 4/2017 | Pappas | G06F 16/3323 |
| 2018/0137772 | A1* | 5/2018 | Rachitsky | H04L 67/10 |
| 2020/0051178 | A1* | 2/2020 | Albouyeh | H04L 67/306 |

* cited by examiner

*Primary Examiner* — Etienne P Leroux
(74) *Attorney, Agent, or Firm* — Sterne, Kessler, Goldstein & Fox P.L.L.C.

(57) ABSTRACT

Disclosed herein are system, method, and computer program product embodiments for generating an influence rank for users within an enterprise community based on a social graph and utilizing the influence rank to customize the user experience in the enterprise community. An influence rank for a user of the enterprise community may be determined based on building a social graph representing the user's interactions within the enterprise community and analyzing the social graph. Communications may be then redirected within the enterprise community based on the determined influence rank.

20 Claims, 5 Drawing Sheets

INFLUENCE RANK GENERATION SYSTEM FOR ENTERPRISE COMMUNITY USING SOCIAL GRAPH

BACKGROUND

An enterprise community may include a variety of applications, such as ecommerce applications, marketing applications, and customer service support applications, which are accessible to participants of the enterprise community. The participants may represent a wide user base with each user having varying levels of engagement within the community. The engagement includes interactions by users with various applications within the enterprise community. Given the number of people and interactions that may take place, this engagement represents an immense amount of information about an enterprise community's user base. But, generally, this information is currently being underutilized as an untapped source of insight into user behaviors within the enterprise communities. Enterprise communities may look to leverage this data to better engage with the users but processing the amount of varied and substantial data and converting that data into an improved user experience within the enterprise communities present unique technical problems requiring distinct systems because existing systems do not know what to do with the data or how it can be used to customize experiences in the enterprise community.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the relevant art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
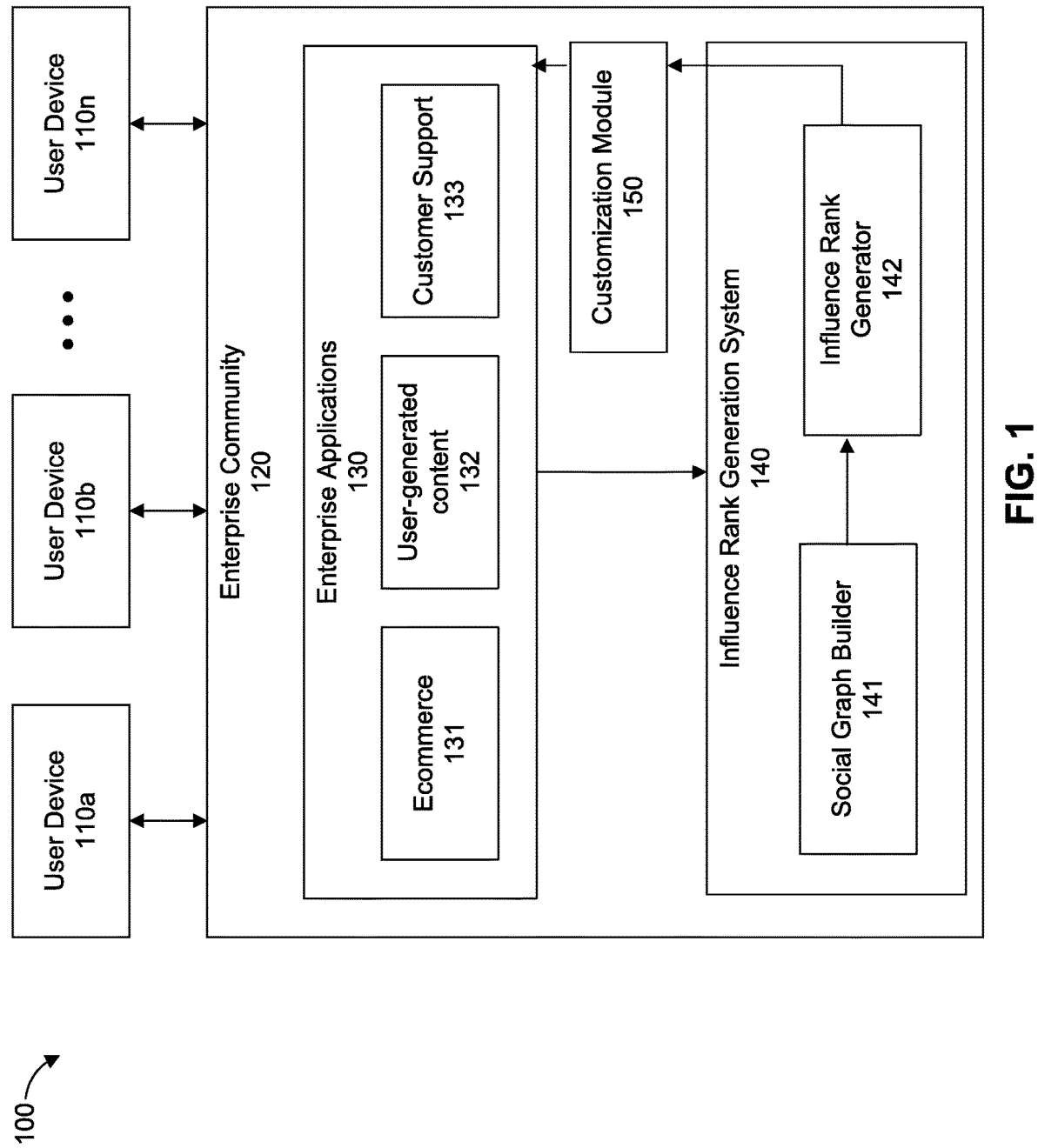
FIG. 1 is a block diagram of an environment including an influence rank generation system, according to some embodiments.

Provided herein are system, apparatus, device, method and/or computer program product embodiments, and/or combinations and sub-combinations thereof, for generating an influence rank for users within an enterprise community based on a social graph and utilizing the influence rank to customize the user experience in the enterprise community.

An influence rank generation system may gather and process any type, variety and volume of data within an enterprise community. An enterprise community is a closed network where access to the network is gated to users that have access privileges such as a user name/password combination. In embodiment, users may be considered members of the closed network which may also associate certain information, such as a profile, interactions, and analytic information, with the users. The data within the enterprise community may represent any type of interaction by users with applications, such as websites, forums, blogs, within the enterprise community. The interactions may include providing comments and reviews on ecommerce websites, submitting questions and answers within customer service support applications, and generating wiki and blogs (i.e., user generated content) that are visited by other users. Interactions may also be associated with the content specified within the interaction. For example, if an interaction is a social media post or a question about a specific product, the interaction may be associated with the product identified by the interaction. An influence rank generation system may allow customization of the enterprise community by, for example, redirecting certain communications to users based on their influence rank as well as manipulating the design and provisioning of user experiences within the enterprise community.

An influence rank generation system may be implemented in a networked and/or cloud-based computing system. The influence rank generation system may monitor and collect interactions submitted by user devices within the enterprise community. Using this information, the influence rank generation system may aggregate interactions with particular applications of the enterprise community in order to build a social graph that represents users, their interactions, and the relationships between each of the users within the enterprise community. Using a social graph to represent the vast amount of interactions that take place within an enterprise community may simplify the analysis of the information within these interactions. The social graph may include nodes that represent users and products as well as links that represent the type of interaction that takes place between the users and products.

The influence rank generation system may also apply machine learning techniques to the social graph to identify patterns and/or to generate the influence rank for each user. The machine learning techniques may include basic sentiment analysis steps that use natural language processing (NLP) to classify the collected interactions as positive, neutral, or negative, applying a page rank algorithm, and learn to rank (LTR) algorithm. By representing the interactions as a social graph, certain machine learning techniques may be used to further organize and eventually rank the information within the social graph. Based on the applied machine learning techniques, an influence rank may be generated to classify the potential impact different users may have throughout the enterprise community. An influence rank may be a numerical representation of how a user's interactions may impact or be viewed by other users within the enterprise community. Impact may refer to how likely a user's interactions are to be viewed by others or to affect the actions of others within the enterprise community.

The collected interactions can be associated with a user based on a user identifier or name, device identifier, or any other identifier that may be used by the user to access applications within the enterprise community using one or several computing devices. For example, a user may have one or more computing devices such as a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. When collected and stored, the interactions may be processed to identify the user associated with the interaction and organizing the interaction based on the identified user.

An influence rank generation system may present data or direct communications to users within the enterprise community based on the generated influence ranks, e.g., prioritizing messages or specific products to users with higher influence ranks within the enterprise community. The influence rank may also be used to customize the user interfaces of users based on the influence rank, e.g., the user interface for users with higher influence ranks may be customized to show specific products or advertising campaigns. Ultimately, the influence rank may be used by communication systems of the enterprise community to identify high-impact users and increase engagement of all users within the enterprise community through targeted messages, advertisement campaigns, and other communications. Such targeting increases the efficacy of user-generated content to reach the user based within the enterprise community and reduces the amount of messages that are transmitted throughout the community.

Accordingly, a need exists for an influence rank generation system to accurately determine high-impact users based on their interactions within the enterprise community in order to provide specific communications and improve user-generated content within the enterprise community.

These features of example embodiments will now be discussed in greater detail with respect to the corresponding figures.

FIG. 1 is a block diagram illustrating environment 100 having an influence rank generation system 140, according to some embodiments. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Environment 100 includes any number of user devices 110a-n and enterprise community 120.

User devices 110a-n may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. A user of user devices 110a-n may be an individual, entity, user, customer, machine, device, etc. using data-driven software applications. A user of user devices 110a-n may be a member of a business, organization, or other suitable group using software designed to perform organizational tasks.

Enterprise community 120 may include enterprise applications 130, influence rank generation system 140, and customization module 150. Enterprise community 120 provides an interface for user devices 110a-n to access and otherwise interact with enterprise applications 130 that may include any number of applications including, but not limited to, ecommerce applications 131, user-generated content applications 132, and customer support applications 133.

Enterprise applications 130 receive content from user devices 110a-n. This content may represent the interactions of users of user devices 110a-n with enterprise applications and may include but are not limited to providing communications to enterprise community 120 such as comments and reviews posted through ecommerce applications 131, generating wiki and blogs (i.e., user generated content) describing content or products through user-generated content applications 132, and submitting questions and answers within customer service support applications 133. Enterprise applications 130 also provide user interfaces for user devices 110a-n to access content provided by other users communicated through enterprise applications.

Enterprise community 120 may also include influence rank generation system 140 which may include social graph builder 141 and influence rank generator 142. Exemplary operations conducted by influence rank generation system 140 may include: converting communications from one format to another, generating graphical representations of the users, communications, the content associated with the communications, and users' interactions with the content, analyzing or mining the data within the graphical representations using regular expressions, machine language techniques, natural language processors, or other mechanism, and generating influence ranks for each user within enterprise community. In an embodiment, enterprise community 120 executes these operations in real-time using parallel and distributed processing, channels, pipelines, and other big-data manipulation techniques.

Social graph builder 141 may transform, convert, analyze or otherwise process data representing interactions from enterprise applications 130 in order to build a graphical representation of the interactions communicated through enterprise applications. The graphical representation may illustrate the relationships between users of the interactions, the interactions themselves, the content of the interactions, and how the user has interacted with the content. In an embodiment, the graphical representation may include nodes and links between the nodes where the nodes represent users, content, and enterprise applications and the linkages represent the interactions of the user with the content. Analysis of interactions includes determining the quality of the interactions. In an embodiment, the quality of the interactions reflects a user's sentiment with the product (e.g., whether the user liked, disliked, or otherwise described the content) which is described further below with respect to social graph 300 in FIG. 3.

Figure 3:
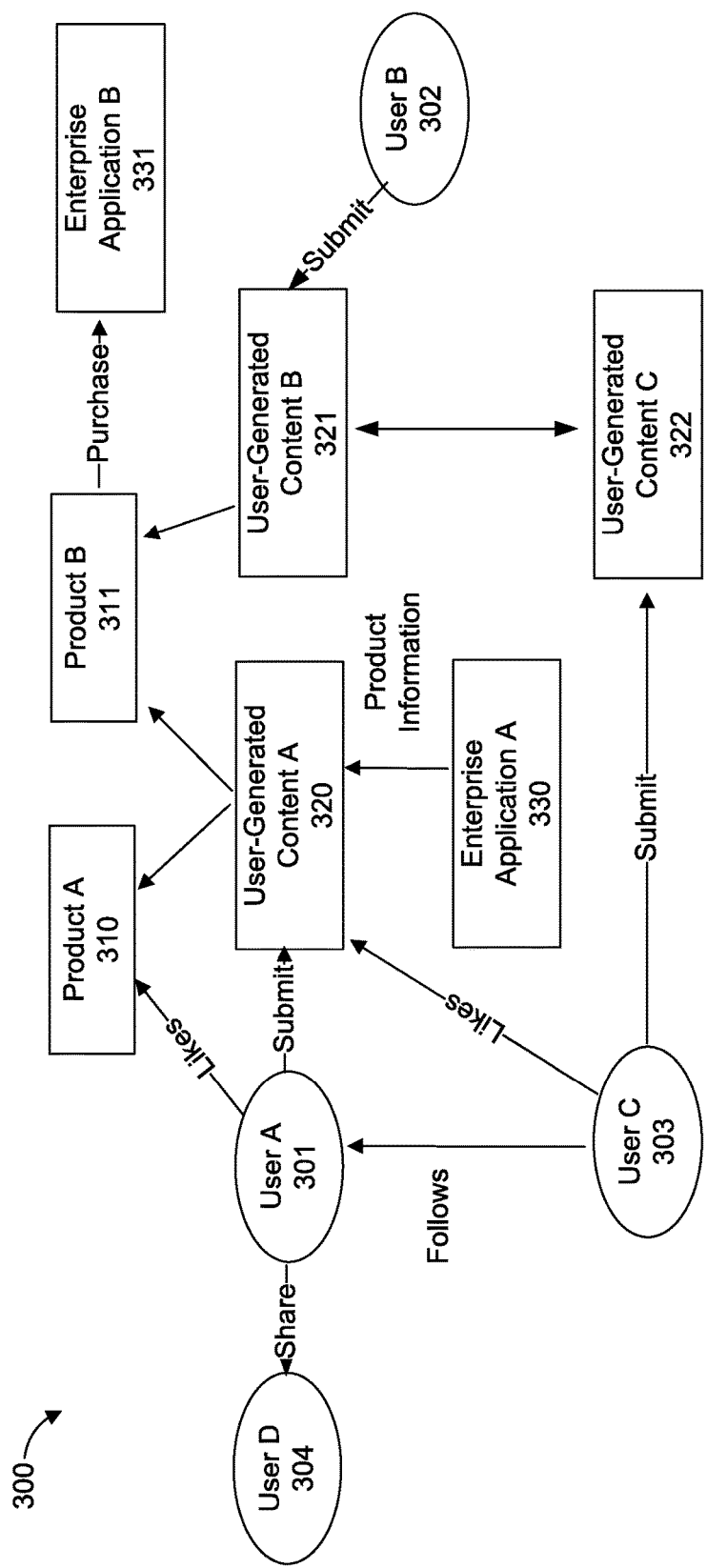
FIG. 3 is an exemplary diagram of a social graph, according to some embodiments.

FIG. 3 illustrates a representative example of a social graph 300, according to some embodiments. Social graph 300 may be generated as a result of a process by social graph builder 141 and includes a number of nodes and links between the nodes. For example, nodes may represent users of enterprise community 120 such as user A 301, user B 302, user C 303, and user D 304; other nodes may represent content of interactions between the users such as product A 310 and product B 311, user-generated content by the users such as user-generated content A 320, user-generated content B 321, and user-generated content C 322, and enterprise applications within enterprise community 120 such as enterprise application A 330 and enterprise application B 331. Nodes may be configured to represent any data within enterprise community 120.

Social graph 300 illustrates the relationships within enterprise community 120 based on the interactions. The relationships may be between the users, user-generated content, the content included within the user-generated content, the enterprise applications, and the user's interaction with the content. For example, social graph 300 illustrates the relationship between user A 301 and user D 304, user C 303, product A 310, and user-generated content A 320. In particular, social graph 300 illustrates that user A 301 has interacted with product A 310 by communicating a positive sentiment toward product A 310. This sentiment may be determined by analyzing the interactions of user A 301 that is represented by user-generated content A 320. User-generated content A 320, which may mention product A 310, may be a direct communication to another user such as user D 304, a blog on a website of user A 301, or a post by user A 301 on a forum or another website, just to name a few examples. In an embodiment, user A 301 may "like" product A 310 such as through a social network website. User C 303 may also interact with user A 301 such as by following user A's communications or by communicating a positive sentiment about user-generated content A 320.

User-generated content A 320 may also indicate product B 311 which is also mentioned in user-generated content B 321. User B 302 may submit user-generated content B 321 which may be a direct communication to another user, a blog on a website of user B 302, or a post by user B 302 on a forum or another website, just to name a few examples. Social graph 300 may also indicate that product B 311 may be purchased through enterprise application B 331, which in some embodiments, is representative of ecommerce application 131. Enterprise application A 330 may provide product information for user-generated content A 320. Social graph 300 may also indicate that user C 303 submits user-generated content C 322 that links with or mentions user-generated content B 321.

Social graph 300 is merely representative of a social graph and is not limited to this example embodiment.

Returning to FIG. 1, influence rank generator 142 receives a social graph from social graph builder 141. Based on the information in the social graph, influence rank generator 142 generates an influence rank for the users in the social graph. In an embodiment, influence rank generator 142 may perform a multi-step process for analyzing the nodes and links in social graph, apply machine learning techniques, and generate the influence rank based on the analyzed relationships between the users and interactions with enterprise applications 130.

In an embodiment, one step of the analysis of the nodes and links includes determining the quality of the interactions by classifying the interactions of a user. Examples of classifications include positive, neutral, or negative reactions by a user with regard to the content of the interactions. For example, the quality of the interaction may refer to whether a user likes or dislikes a product mentioned in the user's communication.

Analysis may further include another step that utilizes a ranking algorithm (e.g., a page rank algorithm) based on metadata associated with the interaction. Examples of metadata may include the number of views of user-generated content and/or products, the number of comments associated with the user-generated content and/or products, number of followers for a user or a user-generated content, or a number of communications in which the user-generated content is associated and/or transmitted by the user within enterprise community 120, just to name a few examples of metadata.

Analysis may further include another step of executing a learning algorithm on information on the interactions represented by social graph 300. Examples of the learning algorithm include a learn-to-rank algorithm which may quantify the interactions based on the output of the previous steps and additional metadata associated with the interactions. Additional metadata may include the type of interaction (e.g., a blog post, comment on a website, a question on a website, an answer, or a direct communication between users) and the type of user (e.g., blogger, poster, customer support) just to name a few examples.

The results of the described analysis may be an influence rank for each user within social graph 300. In an embodiment, the influence rank may be a numerical quantification of the user's potential impact within enterprise community 120. The steps described above may be performed individually or collectively, in sequential order or in different order. Further details of influence rank generator 142 are described with respect to FIG. 2, below.

Enterprise community 120 may also include customization module 150 that communicates with enterprise applications 130 and influence rank generation system 140. In some embodiments, customization module 150 is responsible for utilizing influence ranks generated by influence rank generation system 140 and customizes, based on the influence ranks associated with each user, the behavior of enterprise applications 130 for each user accessing enterprise community 120. Customization module 150 may redirect communications within enterprise applications 130 based on the influence ranks of each user; for example, customization module 150 may prioritize certain communications to and/or customize user interfaces for users with influence ranks above a certain threshold. In an embodiment, users with certain influence ranks may receive communications or be the target of certain advertising campaigns prior to or instead of other users within enterprise community 120. Targeting communications to certain users instead of all users within enterprise increases the efficiency of sales or advertising campaigns within enterprise community 120.

Customization module 150 may also utilize the influence ranks to generate a recommendation. Customization module 150 may generate the recommendation for an administrator or supervisor of enterprise community 120 that identifies actions that may be taken based on the influence ranks. This recommendation may include a list of advertisements, communications, and/or products that may be forwarded to certain users based on the influence ranks. In this manner, customization module 150 may allow administrators to target group a subset of the users within enterprise community 120. Targeting users with specific communications or products may lead to more efficient utilization of sales systems of enterprise community 120. Customization module 150 may present a modified user interface to the targeted users to show or otherwise present the product to the targeted users.

Although not shown, enterprise community 120 may include or be connected to a data repository (not shown) storing relevant data and information such as the communications made in enterprise applications 130. For example, data repository may store the messages and blogs generated using ecommerce applications 131, user-generated content applications 132, and/or customer support applications 133. The data repository may be a database management system or relational database tool. The data repository may further be a message queue or stream processing platform such as Apache Kafka or Apache Spark or other data storage systems like Apache Hadoop, HDFS, or Amazon S3, to name a few examples. Also, data repository may be a data lake, data silo, semi-structured data system (CSV, logs, xml, etc.), unstructured data system, binary data repository, or other suitable repository. Data repository may store objects, rows, transactions, records, files, logs, etc. while allowing for the creation, modification, retrieval, archival, and management of this data. In an embodiment, data repository uses scalable, distributed computing to efficiently catalog, sort, manipulate, and access stored data.

User devices 110a-n may be connected to enterprise community through any number of networks which may be any network or combination of networks including the Internet, a local area network (LAN), a wide area network (WAN), a wireless network, a cellular network, or various other types of networks as would be appreciated by a person of ordinary skill in the art.

Figure 2:
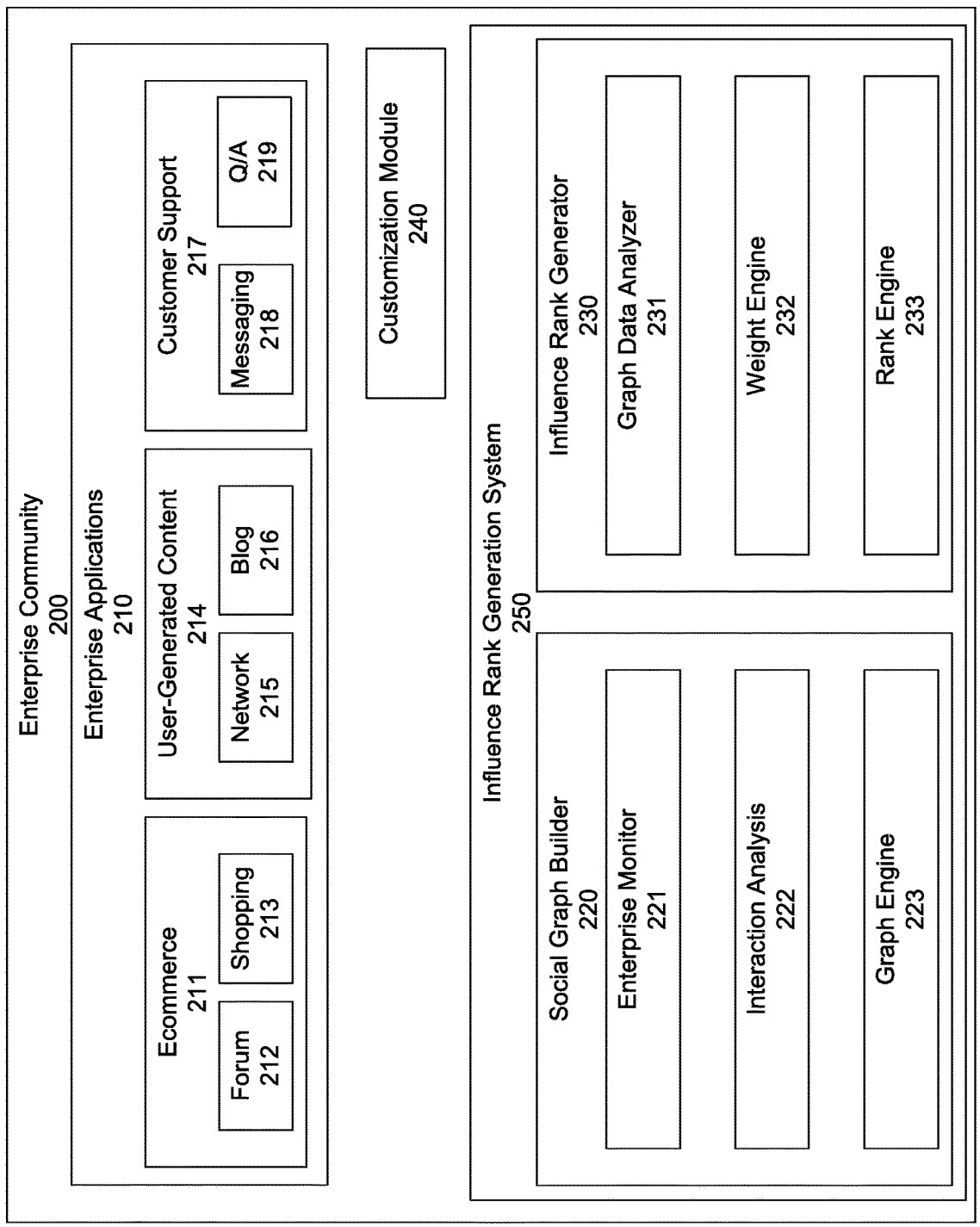
FIG. 2 is a block diagram of an enterprise community, according to some embodiments.

FIG. 2 is a block diagram of an enterprise community 200, according to some embodiments. The implementation provided in FIG. 2 is merely exemplary, and one skilled in the relevant art(s) will appreciate that many approaches may be taken to provide an enterprise community 200 in accordance with this disclosure. Enterprise community 200 may be representative of enterprise community 120 described in reference to FIG. 1. Enterprise community 200 may include enterprise applications 210, influence rank generation system 250, and customization module 240, which may perform at least some operations similar to enterprise applications 120, influence rank generation system 140, and customization module 150 respectively as described with reference to FIG. 1.

Enterprise applications 210 may include ecommerce application 211. Examples of ecommerce applications 211 include but are not limited to forum application 212 that provides access to forums associated with an ecommerce website, and shopping application 213 that provides purchasing, review, and other shopping related functionality with respect to an ecommerce web site.

Enterprise applications 210 may also include user-generated content applications 214. Examples of user-generated content applications 214 include but are not limited to social network application 215 and blogging application 216. Social network application 215 may provide messaging and posting functionality that enable a user of a user device to make communicate messages or posts for viewing by other members of social network application which may include users who access enterprise community 200. Blogging application 216 may provide publishing a blog, a review, a description of any content that is publically accessible by the other users.

Enterprise applications 210 may also include customer support application 217. Examples of customer support application 217 include but are not limited to messaging application 218 and question/answer application 219. Messaging application 218 may provide messaging functionality for users of enterprise community 200 to communicate directly with other users of enterprise community 200 who have been designated to respond to messages. As an example, users may submit messages with regard to a particular product (e.g., a smartphone) and the messages are directed to users of enterprise community 200 who are designated as experts for that particular product. In an embodiment, messaging application 218 may provide real-time communication between users of enterprise community 200.

Question/answer application 219 may provide posting functionality to allow users of enterprise community 200 to post questions with regard to a particular product and other users of enterprise community 200 who have access to question/answer application 219, and may submit responses to the posted question. In an embodiment, question/answer application 219 may provide a mechanism for users to vote or rate responses that best answer the posted question; the response that has the highest number of votes or has the highest rating may be identified or displayed more prominently within question/answer application 219 to other users.

Influence rank generation system 250 may include social graph builder 220 and influence rank generator 230. Social graph builder 220 may include enterprise monitor 221, interaction analysis 222, and graph engine 223. Enterprise monitor 221 may collect and aggregate user interaction data from enterprise applications 210. Enterprise monitor 221 may be implemented as or use an application programming interface (API) configured to communicate with any application of enterprise applications 210. In an embodiment, an API, such as a JavaScript, Java, Python, or other API, may be included in the application and may collect the relevant user monitoring data using files.

In an embodiment, enterprise applications 210 each store user interactions in a locally accessible data repository (not shown) and communicate the user interactions upon request or periodically on a schedule to enterprise monitor 221. Enterprise monitor 221 may aggregate user interactions from all applications of enterprise applications 210.

In an embodiment, user interactions may be classified as user-to-user interactions (the contents of which may include a product), user-to-product interactions, or a combination of both. In an embodiment, user-to-user interactions may include but are not limited to single user interactions that do not result in a particular communication being transmitted. Examples of single user interactions include but are not limited to a liking action (e.g., a user likes a post or message sent by another user) or a follow action (e.g., a user following another user or user-generated content associated with another user). User-to-user interactions may further include communications directed to a user such as a message on social network application 215 or messaging application 218 or a published communication such as a post on social network application 215 or a blog publication through blog application 216.

In an embodiment, user-to-product interactions are user communications that involve (i.e., mention or discuss) a specific product. Examples of user-to-product interactions include but are not limited to posting a review of a product through blog application 216 or through social network application 215, a direct message between users that mention the product such as a message through a customer support application 217, or single user interactions such as a user liking or sharing a product through social network application 215.

Interaction analysis 222 may perform analysis functions on the collected and aggregated user interactions generated by enterprise monitor 221 and/or from enterprise applications 210. This analysis may include using user identification data and device identification data from a cloud account and/or from a local computer profile account. For example, the user identification data may include a user name, age, location, persona, authorizations, roles, and/or other user profile information that may be retrieved from a cloud system and/or from a local system. Using user and device identification data allows interaction analysis 222 to correlate the received interaction data with the user and device identification data.

Interaction analysis 222 also may perform parsing of the user interactions to identify metadata associated with the user interaction such as the type of user interaction (e.g., message, publication, post, liking, sharing), content of the user interaction (e.g., a product), the enterprise applications associated with the user interaction, the user who performed the user interaction, and any users who received or viewed the user interaction. Any identified metadata may then be associated with the interaction data. Interaction analysis 222 may also generate metrics associated with user regarding actions within enterprise community 200 including, but not limited to, the total number views associated with the user and the user-generated content associated with that user, the total number of comments made by the user, the total number of comments made by other users on user-generated content associated with that user, the total number of users that follow and/or friends with the user, and the total number of shares or likes made by the user.

Graph engine 223 may perform the functions of building a social graph utilizing the information generated by enterprise monitor 221 and interaction analysis 222. For example, graph engine 223 may utilize the metadata generated by interaction analysis 222 to build a social graph such as social graph 300 that utilizes certain metadata as nodes in the graph and certain metadata as links between the nodes in the graph. In an embodiment, users, interactions, content in the interactions, and enterprise applications may form nodes in the social graph and the type of interaction is utilized as the link between each node. The generated social graph provides an illustration of the relationships of the interactions and places the metadata of those interactions into a format that can be analyzed (e.g., machine learning) for the purpose of generating an influence rank for each user represented within the social graph.

Influence rank generator 230 may include graph data analyzer 231, weight engine 232, and rank engine 233. Influence rank generator 230 may perform a multi-step analysis of social graphs that may include but is not limited to a quality analysis step, a ranking step, and a machine learning step, to name a few examples. The multi-step analysis may include two or more steps in any combination. For example, steps may be combined into a single step and performed in a centralized manner by a single component or divided into a larger number of steps and performed in a distributed manner across multiple components.

Graph data analyzer 231 may parse social graphs generated by graph engine 223. Parsing social graphs may include calculating the connections (or degrees) of the nodes (or vertices) of the social graph. In an embodiment, the number of connections connected to a node may be based on the number and type of links connected to that node. For example, with regard to FIG. 3, User A 301 may be determined to have four connections between Product A 310, User D 304, User-Generated Content A 320, and User C 303 and those connections may be classified as a "like" link, a "share" link, a "submit" link, and a "follow" link, respectively.

Graph data analyzer 231 may also perform a quality analysis step. In an embodiment, determining the quality of an interaction includes determining a sentiment expressed by a user or users within the interaction. Examples of sentiment may include a positive, neutral, or negative feeling by the user toward particular content contained within the interaction. In an embodiment, graph data analyzer 231 may use natural language processing (NLP) to classify documents as positive, neutral, or negative. For example, graph data analyzer may utilize parse words of the interaction and look for specific key words that are associated with positive, neutral, or negative quality. In an embodiment, graph data analyzer 231 may output a numerical score representing the quality of the interaction where different ranges may represent a negative quality, neutral quality, or a positive quality of the interaction. Graph data analyzer 231 may analyze the interactions for each user within social graphs and calculates a single average quality score for each user that may represent the average sentiment for that user across all of their interactions.

Weight engine 232 may perform a weighting step based on metadata associated with the interactions and the average quality score generated for each user by graph data analyzer 231. Metadata that may be considered by weight engine 232 may include the user, content of the interaction, and metrics associated with the user, which as discussed above may include the total number views associated with the user and the user-generated content associated with that user, the total number of comments made by the user, the total number of comments made by other users on user-generated content associated with that user, the total number of users that follow and/or friends with the user, and the total number of shares or likes made by the user. In an embodiment, weight engine 232 may generate weights representing the value of these different metrics. For example, weight engine 232 may generate weights for the number of views associated with the user, the number of comments, and/or the number of references including the user (i.e., number of times the user has been mentioned by other users in their interactions). In an embodiment, weight engine 232 may apply a page rank algorithm which is used to determine metrics regarding the connections between nodes within the social graph such as a node that has a higher number of connections (or links). Other factors that may be considered in the page rank algorithm include, but are not limited to, user identification, product name, number of views, number of comments, number of followers, number of shares, and quality score. The end result of the page algorithm may be numerical weights assigned to the views, the comments, and the number of references, which may reflect the priority of those metrics within the social graph. In an embodiment, weight engine 232 may perform its functions in an iterative matter (i.e., after graph data analyzer 231).

Rank engine 233 may perform a ranking step on the set of users represented in the social graph based on metadata associated with the interactions, the weights generated by weight engine, and the type of users and interactions. User may be classified based on type such as whether they are associated with different fields (e.g., technology, business, retail) and the type of communications associated with that user (e.g., blog, comments, questions). In an embodiment, rank engine 233 may utilize machine learning techniques, such as a learning-to-rank (LTR) technique, to process the information generated by graph data analyzer 231 and/or weight engine 232. The goal of rank engine 233 is to order the users based on the information generated by graph data analyzer 231 and/or weight engine 232 as well as the type of users and the type of interactions. In an embodiment, rank engine 233 may perform its functions in an iterative matter (i.e., after graph data analyzer 231 and/or weight engine 232).

Rank engine 233 may apply a regression-based technique to generate an ordered list of users of all users within the social graph. This ordered list may include an influence ranks for each user with higher influence ranks reflecting users having the highest number and most weighted connections or links.

Customization module 240 may utilize the influence ranks generated by influence rank generator 230 to modify the behavior of enterprise applications 210 in order to increase user engagement within enterprise community 200. Customization module 240 may identify users having certain influence ranks and redirecting communications within enterprise community 200 (specifically those users instead of to all users). For example, a user having influence ranks above a certain threshold may be identified as impactful users and can be targeted with advertising or promotional campaigns that may result in specific communications, messages, and products being delivered to those users who may then publish, forward, share or otherwise interact with those specific communications within enterprise community 200. Interactions may also include providing private feedback communications through enterprise applications to a marketing team responsible for the advertising campaign. The marketing team may be administrators of enterprise community 200 but not subject to an influence rank. Customization module 240 may also generate and transmit recommendations directly to administrators.

Figure 4:
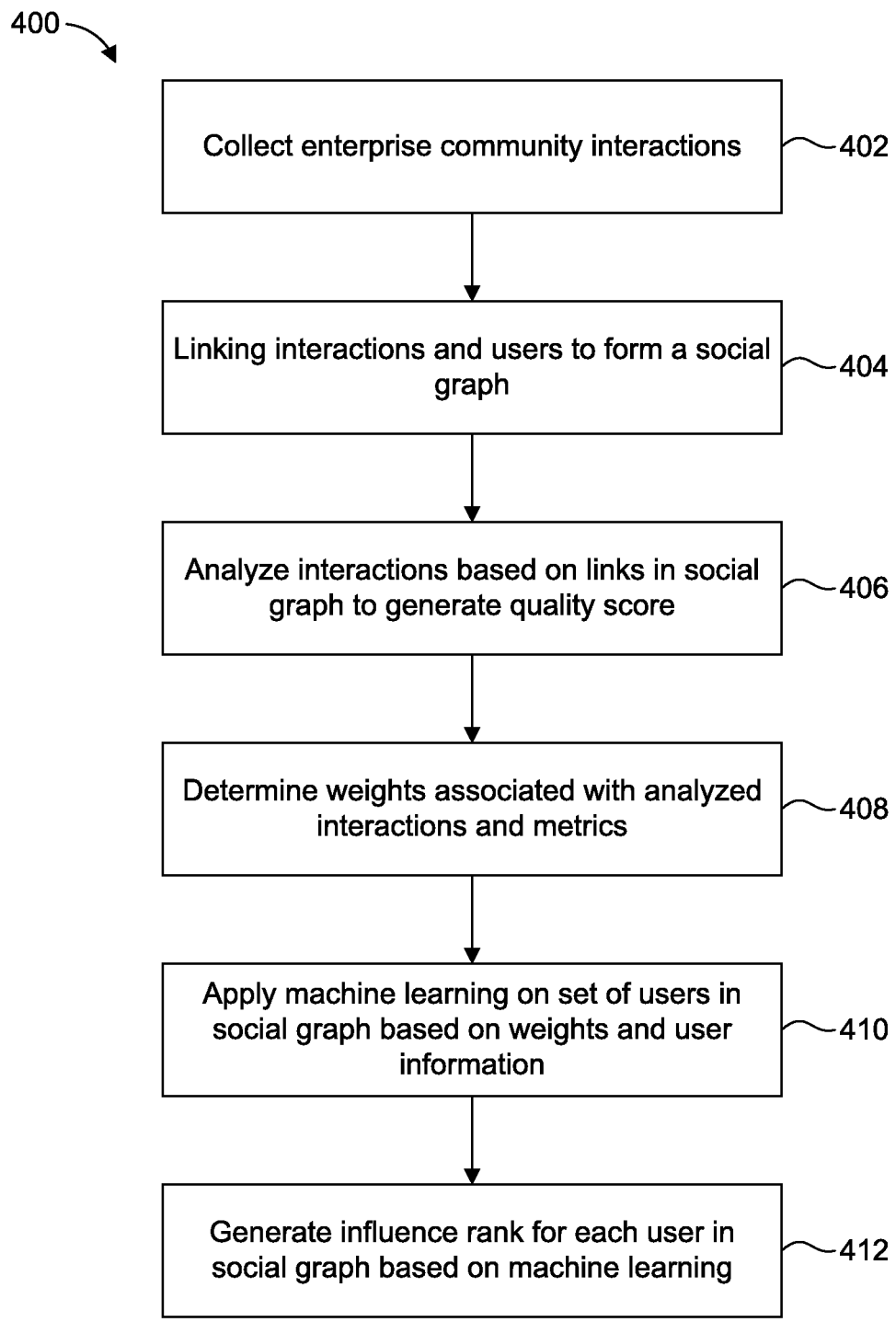
FIG. 4 is a flowchart illustrating a method of generating an influence rank based on analysis of interactions of an enterprise community, according to some embodiments.

FIG. 4 is a flowchart illustrating a method of generating an influence rank based on analysis of interactions of an enterprise community, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

As a non-limiting example with regard to FIG. 2, the steps of method 400 may be performed by components of influence rank generation system 250 such as social graph builder 220, influence rank generator 230, and customization module 240 or some combination thereof. While method 400 will be discussed below as being performed by one or more of these components, other components may store code necessary to execute some or all steps of method 400. Method 400 will be described with reference to FIG. 2. However, method 400 is not limited to that example embodiment.

In 402, influence rank generation system 250 may collect and aggregate interactions by users of enterprise community 200. In an embodiment, influence rank generation system 250 may receive interactions either upon request (e.g., a pull operation) or automatically on a periodic basis from enterprise applications 210 (e.g., a push operation). In an embodiment, influence rank generation system 250 may generate a request to collect interactions from enterprise applications 210 when a social graph of enterprise applications is to be generated. Generation of social graph may be based on a schedule or based on a request to generate or update lists of the influence ranks within enterprise community. For example, influence rank generation system 250 may be configured to periodically update the list of influence ranks and accordingly may be required to periodically collect the interactions from enterprise applications 210. Influence rank generation system 250 may retrieve the information using an appropriate simple, stateless communication pipeline, e.g. a channel or open database connectivity interface with enterprise applications.

In an embodiment, influence rank generation system 250 may aggregate the interactions with previous interactions performed based on user and/or may aggregate the user interactions with interactions from other users. In this manner, influence rank generation system 250 may organize the interaction data and/or categorize interaction data; This organization may be based on user identification and/or based on user attributes. The user attributes may be, for example, user name, user age, user location, user persona, and/or user authorizations or roles.

In 404, influence rank generation system 250 may process the aggregated interaction data retrieved in 402 by linking interactions, which may include metadata as described above, and users to generate a social graph that provides a representation of connections between the users and metadata within enterprise community 200. The linking of interaction data to form the social graph may include forming certain data as nodes and other data as links between the nodes.

In 406, influence rank generation system 250 may analyze the social graph which may include determining a quality score for each of the interactions in the social graph. As noted above, in an embodiment, the quality score may refer to a sentiment assessment of users associated with the interaction to determine a positive, neutral, or negative assessment by the users of content described in the interaction.

In 408, influence rank generation system 250 may utilize the quality score and additional metrics associated with each interaction to determine weights to be applied to each metrics associated with a node in the social graph such as the number of views associated with the user, the number of comments, and/or the number of references including the user (i.e., number of times the user has been mentioned by other users in their interactions). In an embodiment, influence rank generation system 250 employs a pager rank algorithm to analyze the nodes within the social graph, where the nodes may represent users, enterprise applications, and content mentioned in the interactions, and the links between the nodes in order to assign a weight to each of the nodes. In an embodiment, the weight may be based on the probability that the node will be viewed, shared, accessed, mentioned, or followed by other nodes in the social graph and this probability may be generated according to the number of links associated with that node.

In 410, after calculating weights for each node in the social graph, influence rank generation system 250 may then apply machine learning techniques on the set of nodes in the social of graph based on the results of 406 (i.e., quality score) and 408 (i.e., weight) to prioritize the users within the set of users that can be used to generate an influence rank for each user. In an embodiment, the result of the machine learning technique may be an ordered list of users.

In 412, influence rank generation system 250 may then generate an influence rank for each user in the ordered set of users. In an embodiment, the influence rank is a numerical representation of a user's interactions within enterprise community 200. In particular, the influence rank may be based on the number of interactions associated with the user and the number of connections the user has with other users within enterprise community 200. In an embodiment, the influence rank may be generated by first using a learn to rank technique to train the machine learning process. The learn to rank technique may use a linear regression technique to build a function that takes the information from 406, 408, and 410 such as but not limited to the quality score, views, shares, comments, references, type of user, and type of interaction, and output an influence rank based on those inputs. In an embodiment, the influence rank may be represented by a numerical value.

Figure 5:
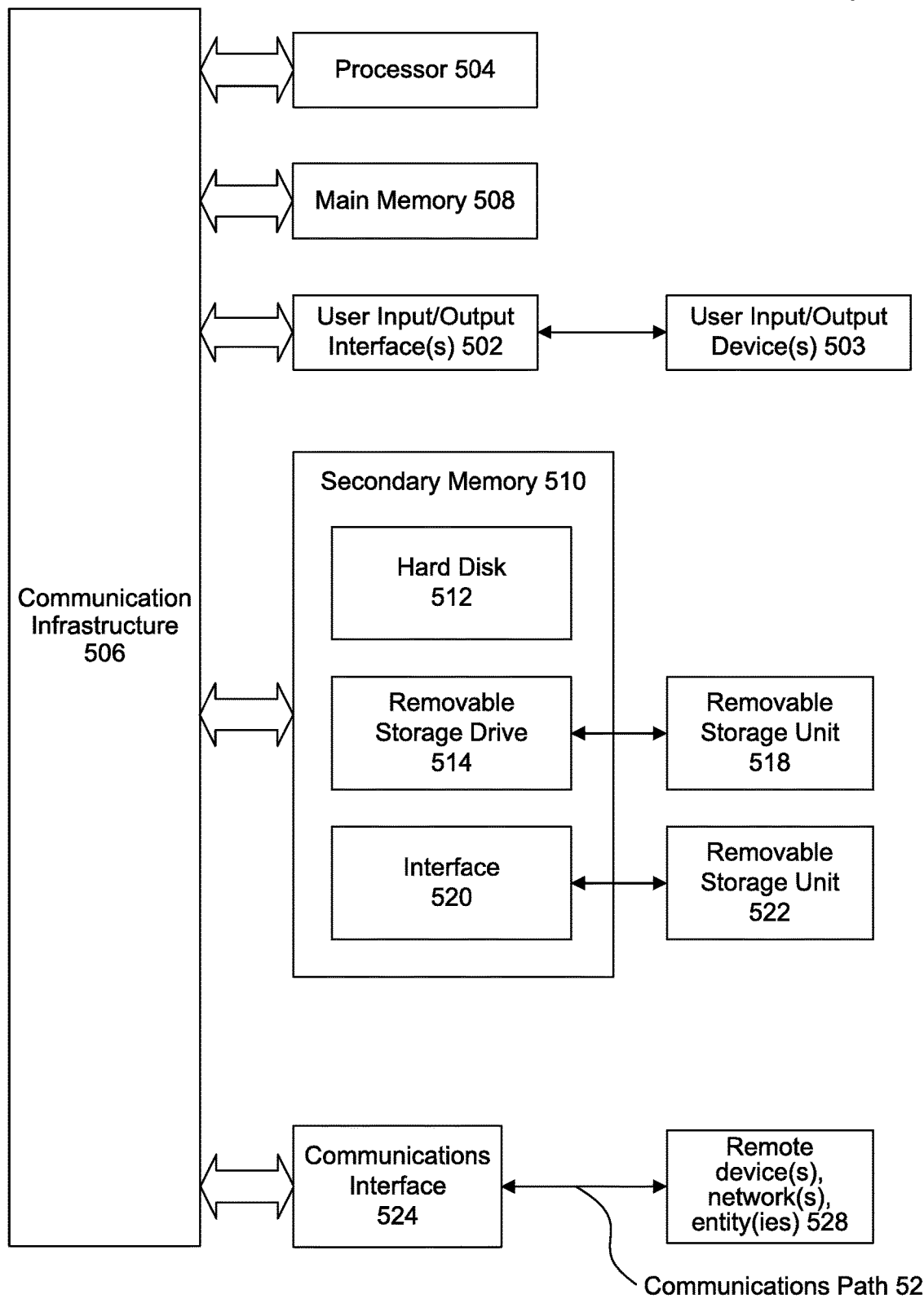
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 508, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for redirecting communications within a closed network wherein the closed network includes an application, comprising:
    monitoring a plurality of interactions transmitted by a plurality of user devices within the closed network;
    determining a rank for a user of the closed network by:
        collecting a first plurality of interactions, transmitted by a first user device of the plurality of user devices associated with the user, from the plurality of interactions;
        building a social graph representing the first plurality of interactions;
        associating, based on the social graph, a quality score to each interaction within the first plurality of interactions;
        calculating at least one weight for each interaction of the first plurality of interactions based on the quality score and at least one metric associated with the interaction;
        calculating the rank based on the at least one weight associated with each interaction of the first plurality of interactions; and
        associating the rank to the user;
    adding the rank to a ranked list, wherein the ranked list includes the rank and other ranks associated with the plurality of user devices, wherein each user device is associated with a respective rank;
    limiting the communications within the closed network by:
        determining a set of ranks within the ranked list that are above a threshold;
        identifying a set of user devices within the plurality of user devices based on the set of ranks, wherein the set of user devices includes the first user device;
        prioritizing the communications within the closed network to the set of user devices,
    wherein at least one of the determining and redirecting are performed by one or more computers.

2. The method of claim 1, wherein the social graph includes information regarding the user and the application associated with each interaction of the first plurality of interactions.

3. The method of claim 1, wherein the application is at least one of an ecommerce application, a customer support application, and a social networking application.

4. The method of claim 3, wherein the first plurality of interactions includes an interaction transmitted by the first user device using the ecommerce application, the customer support application, or the social networking application.

5. The method of claim 1, the building further comprising:
    linking the first plurality of interactions with a second plurality of interactions transmitted by a second user device of the plurality of user devices associated with a second user of the enterprise community.

6. The method of claim 1, further comprising:
    prioritizing each rank in the ranked list; and
    identifying at least one target user device associated with a target user based on the prioritizing.

7. The method of claim 6, the redirecting further comprising:
    transmitting, to the first user device, a message containing information about a product; and
    customizing a graphical user interface for display on the at least one target device within the enterprise community based on the message.

8. A system, comprising:
    a memory; and
    at least one processor coupled to the memory and configured to:
        monitor a plurality of interactions transmitted by a plurality of user devices within a closed network;
        determine a rank for a user of the closed network by:
            collecting a first plurality of interactions, transmitted by a first user device of the plurality of user devices associated with the user, from the plurality of interactions and a second plurality of interactions transmitted by a second user device of the plurality of user devices associated with a second user from the plurality of interactions, wherein the closed network includes an application;
            building a social graph representing the first plurality of interactions;
            associating, based on the social graph, a quality score to each interaction within the first plurality of interactions and the second plurality of interactions;
            calculating at least one weight for each interaction of the first plurality of interactions based on the quality score and at least one metric associated with the interaction;
            calculating the rank based on the at least one weight associated with each interaction of the first plurality of interactions; and
            associating the rank to the user;
        add the rank to a ranked list, wherein the ranked list includes the rank and a second rank associated with the second user device;
        limit the communications within the closed network by:
            determining a set of ranks within the ranked list that are above a threshold;

identifying a set of user devices within the plurality of user devices based on the set of ranks, wherein the set of user devices includes the first user device;
prioritize at least one communication within the enterprise community to the set of user devices.

9. The system of claim 8, wherein the social graph includes information regarding the user and the application associated with each interaction of the first plurality of interactions.

10. The system of claim 8, wherein the application is at least one of an ecommerce application, a customer support application, and a social networking application.

11. The system of claim 10, wherein the first plurality of interactions includes an interaction transmitted by the first user device using the ecommerce application, the customer support application, or the social networking application.

12. The system of claim 8, wherein to build the social graph, the at least one processor is further configured to:
link the first plurality of interactions with the second plurality of interactions.

13. The system of claim 8, the at least one processor further configured to:
prioritize each rank in the ranked list; and
identify at least one target user device associated with a target user based on the prioritizing.

14. The system of claim 13, wherein to redirect the communications, the at least one processor is further configured to:
transmit, to the first user device, a message containing information about a product; and
customize a graphical user interface for display on the at least one target device within the enterprise community based on the message.

15. A non-transitory computer-readable device having instructions stored thereon that, when executed by at least one computing device, cause the at least one computing device to perform operations comprising:
monitoring a plurality of interactions transmitted by a plurality of user devices within a closed network;
determining a rank for a user of the closed network by:
collecting a first plurality of interactions, transmitted by a first user device of the plurality of user devices associated with the user, from the plurality of interactions, wherein the closed network includes an application;
building a social graph representing the first plurality of interactions;
associating, based on the social graph, a quality score to each interaction within the first plurality of interactions;
calculating at least one weight for each interaction of the first plurality of interactions based on the quality score and at least one metric associated with the interaction;
calculating the rank based on the at least one weight associated with each interaction of the first plurality of interactions;
associating the rank to the user;
adding the rank to a ranked list, wherein the ranked list includes the rank and other ranks associated with the plurality of user devices, wherein each user device is associated with a respective rank;
limiting the communications within the closed network by:
determining a set of ranks within the ranked list that are above a threshold;
identifying a set of user devices within the plurality of user devices based on the set of ranks, wherein the set of user devices includes the first user device;
prioritizing at least one communication within the closed network to the set of user devices.

16. The non-transitory computer-readable device of claim 15, wherein the social graph includes information regarding the user and the application associated with each interaction of the first plurality of interactions.

17. The non-transitory computer-readable device of claim 15, wherein the application is at least one of an ecommerce application, a customer support application, and a social networking application.

18. The non-transitory computer-readable device of claim 17, wherein the first plurality of interactions includes an interaction transmitted by the by the first user device using the ecommerce application, the customer support application, or the social networking application.

19. The non-transitory computer-readable device of claim 15, the building further comprising:
linking the first plurality of interactions with a second plurality of interactions transmitted by a second user device of the plurality of user devices associated with a second user of the closed network.

20. The non-transitory computer-readable device of claim 15, the operations further comprising:
prioritizing each rank in the ranked list; and
identifying at least one target device associated with a target user based on the prioritizing.

* * * * *